United States Patent
Wulterkens et al.

(10) Patent No.: US 12,527,518 B2
(45) Date of Patent: Jan. 20, 2026

(54) ASSESSING SLEEP OF A SUBJECT

(71) Applicant: KONINKLIJKE PHILIPS N.V., Eindhoven (NL)

(72) Inventors: Bernice Marielouise Wulterkens, Eindhoven (NL); Pedro Miguel Ferreira Dos Santos Da Fonseca, Borgerhout (BE); Lieke Wilhelmina Alexandra Hermans, Eindhoven (NL); Merel Marietje Van Gilst, Eindhoven (NL); Sebastiaan Overeem, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 282 days.

(21) Appl. No.: 18/132,604

(22) Filed: Apr. 10, 2023

(65) Prior Publication Data
US 2023/0320656 A1    Oct. 12, 2023

Related U.S. Application Data

(60) Provisional application No. 63/329,971, filed on Apr. 12, 2022.

(30) Foreign Application Priority Data

Sep. 30, 2022   (EP) ...................................... 22199180

(51) Int. Cl.
| | |
|---|---|
| *A61B 5/00* | (2006.01) |
| *A61B 5/0205* | (2006.01) |
| *G16H 50/20* | (2018.01) |

(52) U.S. Cl.
CPC .......... *A61B 5/4815* (2013.01); *A61B 5/0205* (2013.01); *A61B 5/4818* (2013.01);
(Continued)

(58) Field of Classification Search
None
See application file for complete search history.

(56) References Cited

U.S. PATENT DOCUMENTS

| 11,577,036 B2 | 2/2023 | Shouldice | |
|---|---|---|---|
| 2015/0164409 A1* | 6/2015 | Benson | A61B 5/1116 600/595 |
| 2015/0313529 A1* | 11/2015 | Nevo | A61B 5/4809 600/595 |

OTHER PUBLICATIONS

Sweetman et al., "Co-Morbid Insomnia and Sleep Apnea (COMISA): Prevalence, Consequences, Methodological Considerations, and Recent Randomized Controlled Trials", Brain Sciences, 2019 vol. 9, 371;doi:10.3390/brainsci9120371, pp. 1.18.

(Continued)

*Primary Examiner* — Sana Sahand

(57) ABSTRACT

According to an aspect, there is provided an apparatus (100) for assessing sleep of a subject, the apparatus comprising a processor (102) configured to: receive data indicative of one or more physiological parameters associated with a subject; determine, based on the data, two or more sleep parameters relating to sleep of the subject; and determine, based on the sleep parameters, whether the subject is suffering from (a) obstructive sleep apnoea, (b) insomnia, (c) comorbid insomnia and obstructive sleep apnoea, or (d) neither obstructive sleep apnoea nor insomnia, wherein a first sleep parameter of the two or more sleep parameters comprises Wakefulness After Sleep Onset for at least X Minutes, $WASO_{Xmin}$, wherein $WASO_{Xmin}$ comprises the sum of awakenings with a duration of X minutes or longer during a sleep session, wherein X is equal to, or greater than, 1.

15 Claims, 4 Drawing Sheets

(52) U.S. Cl.
CPC ........... *A61B 5/7264* (2013.01); *G16H 50/20* (2018.01); *A61B 5/4809* (2013.01); *A61B 5/4812* (2013.01)

(56) References Cited

OTHER PUBLICATIONS

Watson et al., Artificial Intelligence and Sleep: Advancing sleep medicine:, Sleep Medicine Reviews, W.B. Saunders, Amsterdam, NL, vol. 59, Jun. 2, 2021, XP086784775, ISSN: 1087-0792, retrieved on Jun. 2, 2021.

Sweetman et al., "Developing a successful treatment for co-morbid insomnia and sleep apnoea", Sleep Medicine Reviews 33, (2017) 27-28, pp. 28-38.

\* cited by examiner

ASSESSING SLEEP OF A SUBJECT

CROSS REFERENCE TO RELATED APPLICATION

This application claims the benefit of U.S. Provisional Patent Application Ser. No. 63/329,971, filed Apr. 12, 2022 and European Patent Application Ser. No. 22199180.5, filed on Sep. 30, 2022. These applications are hereby incorporated by reference herein.

FIELD OF THE INVENTION

The invention relates to an apparatus and a method for assessing sleep of a subject and, more particularly, to determining a sleep parameter associated with the subject.

BACKGROUND OF THE INVENTION

Insomnia and obstructive sleep apnoea (OSA) commonly co-occur, known as comorbid insomnia and obstructive sleep apnoea (COMISA). COMISA is associated with greater morbidity for a subject compared to insomnia or OSA alone. Differentiating between insomnia, OSA and COMISA is challenging due to the overlapping symptoms associated with insomnia and OSA and due to the different approaches used to identify each disorder. For instance, while polysomnography is considered by some to be the gold standard technique for identifying OSA, the identification of insomnia is typically based on subjective measurements. Thus, single night standard sleep parameters derived from single night polysomnography may not be sufficient to distinguish between subjects with COMISA and subjects with only insomnia or OSA. For a subject suffering from COMISA, once insomnia or OSA has been identified, the other condition can be difficult to identify and is often missed. Identifying that a subject is suffering from COMISA is important as appropriate treatment options can then be offered. For example, subjects with COMISA may benefit from cognitive behavioural therapy for insomnia (e.g., CBTi) before, or at the same time as, starting positive airway pressure (PAP) therapy.

SUMMARY OF THE INVENTION

An aim of the invention disclosed herein is to provide a way in which COMISA can be identified objectively, reliably, and accurately. Using a combination of multiple objectively measured sleep parameters, it is possible to distinguish between subjects with insomnia, OSA, COMISA, and neither insomnia nor OSA.

According to a first specific aspect, there is provided an apparatus for assessing sleep of a subject. The apparatus comprises a processor configured to: receive data indicative of one or more physiological parameters associated with a subject; determine, based on the data, two or more sleep parameters relating to sleep of the subject; and determine, based on the sleep parameters, whether the subject is suffering from (a) obstructive sleep apnoea, (b) insomnia, (c) comorbid insomnia and obstructive sleep apnoea, or (d) neither obstructive sleep apnoea nor insomnia, wherein a first sleep parameter of the two or more sleep parameters comprises Wakefulness After Sleep Onset for at least X Minutes, $WASO_{Xmin}$, wherein $WASO_{Xmin}$ comprises the sum of awakenings with a duration of X minutes or longer during a sleep session, wherein X is equal to, or greater than, 1.

In some embodiments, $WASO_{Xmin}$ may comprise $WASO_{5min}$.

In some embodiments, a second sleep parameter of the two or more sleep parameters may comprise a parameter selected from a group comprising: apnoea-hypopnea index, oxygen desaturation index, a mean duration of awakenings during a sleep session, a variance in durations of awakenings during a sleep session, a number of awakenings longer than a defined time period during the sleep session, wake after sleep onset, total sleep time, apnoea index, hypopnea index, 3% oxygen desaturation index, 4% oxygen desaturation index, sleep onset latency, sleep efficiency, time in an N1 sleep stage, time in an N2 sleep stage, time in an N3 sleep stage, time in an REM sleep stage, a number of sleep stage transitions, and a number of sleep stage transitions per unit time, a duration in which the subject is in a sleep stage during a sleep session, and a number of transitions between any two of stages N1, N2, N3, REM and wake.

The processor of the apparatus may, in some embodiments, be further configured to: generate, based on the determination that the subject is suffering from (a), (b), (c) or (d), a control signal for delivery to a recipient device.

In some embodiments, the processor of the apparatus is configured to use a rule-based method to determine whether the subject is suffering from (a), (b), (c) or (d). The rule-based method may comprise: comparing each of the two or more sleep parameters to a respective threshold value.

The rule-based method may, in some embodiments, further comprise: assigning a weight to each of the two or more sleep parameters; and calculating a sum of the weights corresponding to each sleep parameter that satisfies a respective condition based on a respective comparison of each of the two or more sleep parameters to its respective threshold value, wherein the step of determining whether a subject is suffering from (a), (b), (c) or (d) may comprise using the sum of the weights.

In some embodiments, the processor of the apparatus is configured to determine whether the subject is suffering from (a), (b), (c) or (d) by using a decision tree comprising two or more nodes, each of the two or more nodes relating to a respective sleep parameter of the two or more sleep parameters. The processor is further configured to: compare each of the two or more sleep parameters to respective threshold values.

The processor of the apparatus may, in some embodiments, be configured to determine whether the subject is suffering from (a), (b), (c) or (d) by using a clustering algorithm. The processor is further configured to: associate the subject with a cluster comprising subjects who have been determined to have suffered from one of (a), (b), (c) or (d) according to physiological data.

In some embodiments, the processor of the apparatus is configured to determine whether the subject is suffering from (a), (b), (c) or (d) by using a predictive model trained to classify the subject as suffering from (a), (b), (c) or (d) based on inputs comprising the received data. The predictive model may, in some embodiments, comprise a Naïve Bayes classifier, a K-Nearest Neighbors algorithm, or an artificial neural network.

In some embodiments, the data indicative of a physiological parameter associated with a subject may comprise at least one type of data selected from a group comprising: polysomnography data, electroencephalogram data, electrooculogram data, electromyogram data, electrocardiogram data, photoplethysmography data, respiratory belt data, ballistocardiography data, inductance data, capacitance data, airflow data, Doppler radar data, accelerometer data, image data, and pulse oximetry data. The processor may, in some embodiments, be configured to determine whether the subject is suffering from (a), (b), (c) or (d) further based on information comprising one of more of: a gender of the subject, a body mass index of the subject, and an age of the subject.

In some embodiments, the received data may comprise data from a plurality of sleep sessions, and wherein the processor is configured to determine whether the subject is suffering from (a), (b), (c) or (d) further based on a parameter indicative of a variability of at least one of the determined sleep parameters between the sleep sessions.

According to a second aspect, a computer-implemented method for assessing sleep of a subject is provided, the method comprising: receiving data indicative of one or more physiological parameters associated with a subject; determining, based on the data, two or more sleep parameters relating to sleep of the subject; and determining, based on the sleep parameters, whether the subject is suffering from (a) obstructive sleep apnoea, (b) insomnia, (c) comorbid insomnia and obstructive sleep apnoea, or (d) neither obstructive sleep apnoea nor insomnia, wherein a first sleep parameter of the two or more sleep parameters comprises Wakefulness After Sleep Onset for at least X Minutes, $WASO_{Xmin}$, wherein $WASO_{Xmin}$ comprises the sum of awakenings with a duration of X minutes or longer during a sleep session, wherein X is equal to, or greater than, 1.

According to a third aspect, a computer program product is provided, the computer program product having instructions, which when executed by a processor, cause the processor to perform steps of the method according to the second aspect.

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION OF EMBODIMENTS

A subject may be suffering from insomnia, OSA, COMISA or neither insomnia nor OSA. COMISA is associated with a greater morbidity for a subject than OSA or insomnia alone. Currently, there is no established method to identify subjects with COMISA, and subjective measurements typically used to identify subjects with insomnia are generally not sufficient to identify subjects with OSA while objective measurements used to identify subjects with OSA are generally not sufficient to identify subjects with insomnia. Often, identification of COMISA is missed because a subject is determined to be suffering from either OSA or insomnia. An aim of the invention disclosed herein it to provide an objective, reliable, and accurate way to identify whether a subject is suffering from OSA, insomnia, COMISA, or neither OSA nor insomnia.

Figure 1:
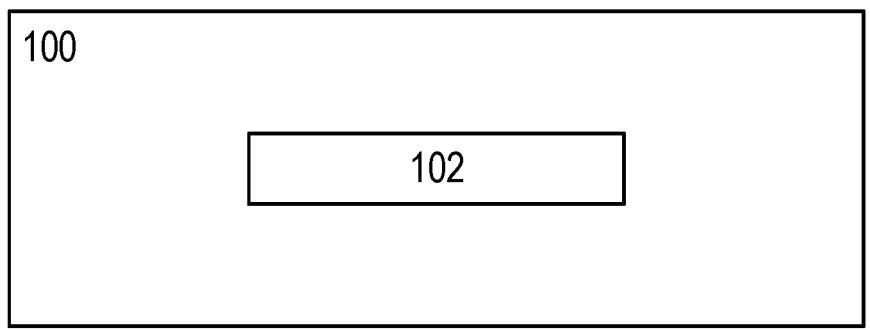
FIG. 1 is a schematic illustration of an example of an apparatus for assessing sleep of a subject.

According to a first aspect, the present invention provides an apparatus 100 for assessing sleep of a subject. FIG. 1 shows an example of such an apparatus 100. The apparatus 100 comprises a processor 102 configured to receive data indicative of one or more physiological parameters associated with the subject. The data may be received from a sensor directly (e.g., in real time or from a memory of the sensor) or from a memory (e.g., from a memory of a computer, from a server located in the cloud, or the like). Physiological parameters may include parameters relating to the subject's breathing (e.g., respiration rate, respiratory effort, tidal volume, or the like), cardiac activity (e.g., heart, or pulse, rate, heart rate variability, or the like), brain activity, ocular activity, submental muscle tone, blood oxygen concentration, a motion of a body part of the subject, or the like. In some examples, the data indicative of a physiological parameter associated with the subject may comprise one or more types of data selected from a group comprising: polysomnography data, electroencephalogram data, electrooculogram data, electromyogram data, electrocardiogram data, photoplethysmography data, respiratory belt data, ballistocardiography data (e.g., using bed sensors), inductance data, capacitance data, airflow data (e.g., using airflow sensors comprising, for example, oral nasal cannulas, PAP devices, non-invasive ventilation (NIV) devices, or the like), Doppler radar data, accelerometer data (e.g., seismocardiography data), image data, and pulse oximetry data. In some examples, standard (e.g., clinical) polysomnography may be used to objectively measure sleep, which may comprise data indicative of a physiological parameter associated with a subject. In other examples, a simplified electroencephalogram (e.g., with reduced electrodes or montages, and/or with dry electrodes) may be used, which may be better suited and more comfortable for home use. A sleep parameter may be determined objectively based on data from the sources mentioned above. The methods of obtaining data relating to sleep of a subject mentioned above may be referred to as surrogate methods, which may generate data based on a cardiac or respiratory modality.

The processor 102 is further configured to determine, based on the received data, two or more sleep parameters relating to sleep of the subject. A first sleep parameter of the two or more sleep parameters comprises Wakefulness After Sleep Onset for at least X Minutes, $WASO_{Xmin}$, wherein $WASO_{Xmin}$ comprises the sum of awakenings with a duration of X minutes or longer during a sleep session, wherein X is equal to, or greater than, 1. In some examples, X may be 1 minute, 2 minutes, 3 minutes, 4 minutes, 5 minutes, 10 minutes, 15 minutes, or the like. $WASO_{Xmin}$ may be determined for a given sleep session by: (i) determining all intervals of wake between sleep onset (WASO), and sleep offset, (ii) filtering out all intervals below a certain duration (e.g., X minutes) such that the remaining intervals may correspond to conscious awakenings (e.g., when the patient typically recognizes and remembers being awake), and (iii) sum the duration of the remaining intervals to obtain the resulting total wake after sleep onset time for awakenings of at least 5 minutes. Put another way, $WASO_{Xmin}$ may comprise the sum of the duration of awakenings when each awakening has a duration of at least a minimum duration (e.g., of X minutes) during a sleep session.

$WASO_{Xmin}$ provides information about wakefulness during a sleep session (e.g., during the course of a night's sleep) for prolonged periods that can be indicative for episodes of insomnia. This parameter may also be used to identify the presence of COMISA. In some examples, WASO may be calculated for a sleep session for all instances where a subject was awake after sleep onset for less than 5 minutes, 10 minutes, 15 minutes, or the like. This may be referred to as $WASO_{<5min}$, $WASO_{<10min}$ and $WASO_{<15min}$, respectively.

Sleep statistics may be calculated over the course of a sleep session (e.g., over the course of a night's sleep). For example, the number of long awakenings (e.g., with a duration≥5 minutes) in subjects with COMISA may be higher than in subjects with OSA. As another example, the mean duration of awakenings may be higher in subjects with COMISA than subjects with OSA since it is expected that sleep of subjects with COMISA contains characteristics of insomnia and thus more awakenings for prolonged periods. Total sleep time (TST) may be to be shorter in both subjects with COMISA and subjects with insomnia compared to subjects with OSA due to the disruption of sleep by prolonged wake periods. WASO may be longer in both subjects with insomnia and subjects with COMISA compared to patients with OSA. However, a long WASO can consist of a large number of short awakenings or a low number of long awakenings. Therefore, $WASO_{5min}$ may be used to identify the presence of wakefulness for prolonged periods, and thus help to differentiate between subjects with insomnia, COMISA or OSA.

A sleep parameter may comprise one or more parameters selected from a group comprising: apnoea-hypopnea index (AHI), oxygen desaturation index (ODI), a mean duration of awakenings during a sleep session, a variance in durations of awakenings during a sleep session, a number of awakenings longer than a defined time period during the sleep session, wake after sleep onset (WASO), total sleep time, apnoea index, hypopnea index, 3% oxygen desaturation index, 4% oxygen desaturation index, sleep onset latency, sleep efficiency, time in an N1 sleep stage, time in an N2 sleep stage, time in an N3 sleep stage, time in an REM sleep stage, a number of sleep stage transitions, a number of sleep stage transitions per unit time, a duration in which the subject is in a sleep stage during a sleep session, and a number of transitions between any two of stages N1, N2, N3, REM and wake. In some examples, a count (e.g., a number, or total) of a sleep stage (e.g., N1, N2, N3, REM, or Wake) that is determined to follow a sleep disordered breathing events (e.g., a hypopnea, an apnoea, or the like) may be determined. In some examples, a mean of and/or variance in a duration of uninterrupted sequences of epochs of a given sleep stage (e.g., N1, N2, N3 and REM) may be determined.

AHI or ODI may be higher for subjects with OSA or COMISA and may be lower for subjects with insomnia. It may be possible to distinguish subjects with COMISA from subjects with insomnia based on AHI; for example, subjects with COMISA may have AHI≥5 whereas subjects with insomnia may have AHI<5. In some examples, different thresholds may be used depending on the presence of additional symptoms. For example, if there are no complaints of daytime symptoms (e.g., sleepiness, difficulty concentrating, or the like), a threshold for distinguishing between subjects with OSA or COMISA and subjects with insomnia or neither insomnia nor OSA may be higher (e.g., AHI equal to, or greater than, 10, AHI equal to, or greater than, 15, or the like). As another example, in the presence of other comorbidities (e.g., cardiac), or if there are complaints regarding daytime functioning, then a threshold for AHI for distinguishing between subjects with OSA or COMISA and subjects with insomnia or neither insomnia nor OSA may be equal to, or greater than, 5.

Table 1 provides examples of several parameters (e.g., sleep parameters) that may be used to discriminate between subjects with COMISA and subjects with OSA. Data shown in the table was obtained from 326 subjects, which included 199 subjects with OSA, 45 subjects with insomnia and 82 subjects with COMISA. The subjects were characterised as suffering from one of insomnia, OSA, COMISA or neither insomnia nor OSA based on detailed overnight measurements and assessment by multiple expert sleep clinicians. The values shown in Table 1 are median values with first and third quartiles (Q1-Q3) values presented in brackets. Abbreviations: AHI: Apnea-Hypopnea index, AI: Apnea index, BMI: Body Mass Index, COMISA: comorbid insomnia and sleep apnea, HI: Hypopnea index, ODI3%: 3% oxygen desaturation index, ODI4%: 4% oxygen desaturation index, OSA: Obstructive sleep apnea, REM: rapid eye movement, SE: sleep efficiency, SOL: sleep onset latency, TST: total sleep time. WASO was found to be significantly shorter in the OSA group compared to the COMISA group (p<0.01) and the insomnia group (p<0.01), whereas no significant differences were found in the total number of awakenings and the number of short awakenings (up to and including two minutes) and the number of medium length awakenings (2.5 to 4.5 minutes inclusive). The number of long awakenings (five minutes or longer) and WASO containing only long awakenings (of five minutes or longer) was significantly lower for subjects with OSA compared to subjects with COMISA (p<0.01 and p<0.001 respectively) and subjects with insomnia (p<0.01 and p<0.001 respectively). The apnoea-hypopnea index and the 4% oxygen desaturation index were significantly lower for subjects with COMISA compared to subjects with OSA (p=0.0136 and p<0.01 respectively).

TABLE 1

Sleep statistics

| | OSA (n = 199) | COMISA (n = 80) | Insomnia (n = 47) | $\chi^2$ | p value |
|---|---|---|---|---|---|
| Female (% female) | 57 (28.6) | 32 (40.0) | 20 (42.6) | 5.3 | 0.070 |
| Age [range min., max.] [years] | 55 (46-62) [22, 81] | 55.5 (47.5-60.5) [23, 76] | 54 (45.5-61) [21, 76] | 0.1 | 0.958 |
| BMI [kg/m2] | 27.9 (25.3-31.2) ‡ | 27.5 (24.8-29.7) † | 24.5 (22.9-27.8) | 18.4 | <0.001 |
| AHI [events/hour] | 21.6 (12.1-35.4) *, ‡ | 16.6 (10.4-28.0) † | 6.8 (2.8-11.3) | 68.0 | <0.001 |
| AI [events/hour] | 1.1 (0.0-3.7) ‡ | 0.5 (0.1-1.9) † | 0.0 (0.0-0.2) | 36.9 | <0.001 |
| HI [events/hour] | 18.1 (10.9-28.6) ‡ | 14.7 (9.8-23.8) † | 6.2 (2.6-10.6) | 59.4 | <0.001 |
| $ODI_{3\%}$ [events/hour] | 15.6 (6.6-28.8) ‡ | 10.6 (5.1-22.0) † | 2.5 (1.0-5.8) | 54.9 | <0.001 |
| $ODI_{4\%}$ | 8.5 (2.7-16.2) *, ‡ | 4.5 (1.7-13.2) † | 0.8 (0.2-2.2) | 56.4 | <0.001 |

TABLE 1-continued

| Sleep statistics | | | | | |
|---|---|---|---|---|---|
| | OSA (n = 199) | COMISA (n = 80) | Insomnia (n = 47) | $\chi^2$ | p value |
| [events/hour] | | | | | |
| SOL [min] | 11.0 (5.0-21.8) | 12.5 (6.0-29.8) | 12.5 (8.3-23.3) | 3.5 | 0.176 |
| TST [min] | 418.5 (374.0-456.5) *, ‡ | 391.5 (338.5-436.0) | 381.5 (317.5-420.5) | 22.8 | <0.001 |
| SE [%] | 84.4 (76.4-89.8) *, ‡ | 77.3 (70.3-84.6) | 78.2 (64.0-85.3) | 18.5 | <0.001 |
| Time in N1 [%] | 14.6 (10.1 -20.1) | 12.7 (10.1-19.0) | 13.0 (8.3-19.6) | 3.5 | 0.175 |
| Time in N2 [%] | 51.9 (46.7-56.9) | 54.2 (46.7-60.5) | 52.6 (45.3-59.4) | 3.7 | 0.154 |
| Time in N3 [%] | 16.0 (11.5-20.4) | 15.4 (9.5-21.2) | 17.3 (11.7-22.9) | 1.1 | 0.583 |
| Time in REM [%] | 16.0 (12.1-19.7) | 16.2 (11.4-19.0) | 16.8 (12.2-19.8) | 0.5 | 0.769 |
| Sleep stage transitions [n] | 218.0 (164.0-272.0) *, ‡ | 194.0 (147.5-230.0) † | 156.0 (117.0-187.5) | 30.3 | <0.001 |
| Sleep stage transition index [n/hour] | 31.5 (23.7-40.7) | 30.9 (23.6-39.4) | 25.2 (19.6-34.1) | 9.01 | 0.011 |
| WASO [min] | 60.0 (36.5-95.5) *, ‡ | 83.3 (56.0-112.5) | 83.5 (43.3-139.0) | 10.7 | 0.005 |
| No. of awakenings [n] | 36.0 (27.0-49.5) | 36.0 (26.5-50.0) | 32.0 (25.0-42.5) | 4.9 | 0.085 |
| No. of awakening index [n/hour sleep] | 5.3 (3.7-7.4) | 5.6 (4.3-8.2) | 5.4 (3.9-6.7) | 1.3 | 0.532 |
| Mean duration awakening [min] | 1.4 (1.1-2.2) *, ‡ | 2.0 (1.3-2.8) | 2.6 (1.4-3.7) | 18.7 | <0.001 |
| No. of short awakenings (duration ≤2 min) [n] | 28.0 (20.0-41.0) | 28.0 (20.5-38.5) | 23.0 (17.0-35.0) | 6.1 | 0.047 |
| No. of medium-length awakenings (duration between 2.5-4.5 min) [n] | 3.0 (1.0-4.0) | 3.0 (1.0-4.5) | 2.0 (1.0-3.0) | 4.6 | 0.098 |
| No. of long awakenings (duration ≥5 min) [n] | 2.0 (1.0-3.0) *, ‡ | 3.0 (2.0-5.0) | 3.0 (2.0-5.0) | 11.2 | 0.004 |
| $WASO_{\geq 5\ min}$ [min] | 25.5 (9.5-51.3) *, ‡ | 43.3 (18.8-75.0) | 56.0 (19.3-97.5) | 17.7 | <0.001 |

* OSA is different from COMISA, p < 0.0167
‡ OSA is different from insomnia, p < 0.0167
† COMISA is different from insomnia, p < 0.0167

The processor 102 is further configured to determine, based on the sleep parameters, whether the subject is suffering from (a) obstructive sleep apnoea, (b) insomnia, (c) comorbid insomnia and obstructive sleep apnoea, or (d) neither obstructive sleep apnoea nor insomnia. In response to a determination that a subject is suffering from one of (a) to (d), the processor 102 may be configured to generate a control signal for delivery to a recipient device. In some examples, a recipient device may comprise a sensor, a display, a processor, or the like. A control signal may, for example, comprise a signal configured to cause a display to present information relating to whether the subject experienced one of (a) to (d). In other examples, the control signal may comprise a signal causing an alarm to sound, a setting of a sensor to change, a flag to be raised, or the like. A flag may comprise a recommendation to screen a subject for comorbid insomnia, in addition to an OSA screening. In some examples, the determination of whether a subject is suffering from one of (a) to (d) may be used (i) in a decision support system, which may be used to guide a physician into defining a personalized treatment pathway, (ii) during a follow-up to an existing therapy (e.g., to establish if and/or why a current treatment pathway is insufficient to fully address symptoms and complaints) and/or (iii) during a follow-up to an existing therapy (e.g., to flag to a healthcare professional who may be following up on aspects related to therapy (e.g., on compliance) that the patient may have a comorbidity that may impact compliance, adherence and/or outcome of a treatment. In some examples, a recommendation may be made regarding the possible presence and/or severity of a comorbid issue (e.g., one that may not have been identified previously), and which may require additional intervention (e.g., positive airway pressure therapy in the case where COMISA is identified in a patient previously suspected of insomnia, or CBTi in case COMISA is identified in a patient previously suspected of OSA, or the like).

In some examples, it may be established that a subject is suffering from OSA (e.g., if AHI is higher than a given threshold, for example, 5). In this case, the processor 102 may be configured to determine if the subject is suffering from pure OSA or, alternatively, COMISA. In other words, it may be known that a subject is suffering from OSA (e.g., before the processor 102 receives data indicative of one or more physiological parameters) such that the processor 102 may be configured to determine whether the subject is suffering from pure OSA or from COMISA. The processor 102 may be configured to exclude the possibility that the subject is suffering from (b) insomnia and the possibility that the subject is suffering from (d) neither insomnia nor OSA.

In some examples, it may be determined that a subject is suffering from a sleep disorder, with a high pre-test probability (e.g., 80%, 90%, 95% or the like) that the sleep disorder is one of OSA, insomnia or COMISA. In this case, the processor 102 may be configured to determine whether the subject is suffering from OSA, insomnia, or COMISA.

In other words, the processor 102 may exclude the possibility that the subject is suffering from (d) neither insomnia nor OSA.

In some embodiments, the processor 102 may be configured to use a rule-based method to determine whether the subject is suffering from (a), (b), (c) or (d). The rule-based method may comprise comparing each of the two or more sleep parameters to a respective threshold value. In other words, a first sleep parameter may be compared to a first threshold value, and a second sleep parameter may be compared to a second threshold value. By way of example only, if, for instance, it is determined that the first sleep parameter is greater than the first threshold value and the second sleep parameter is greater than the second threshold value, then it may be determined that the subject is suffering from COMISA. If it is determined that the first sleep parameter is greater than the first threshold value and that the second sleep parameter is less than the second threshold value, it may be determined that the subject is suffering from OSA. If it is determined that the first sleep parameter is less than the first threshold value and that the second sleep parameter is greater than the second threshold value, it may be determined that the subject is suffering from insomnia. If it is determined that the first sleep parameter is less than the first threshold value and that the second sleep parameter is less than the second threshold value, it may be determined that the subject is not suffering from OSA nor from insomnia.

The rules (e.g., heuristic rules) may comprise pre-established rules based on sleep characteristics that are discriminative between subject's suffering from one of (a) to (d). For example, a polysomnogram may be obtained for a subject, such that COMISA may be identified if the following rules are all true for a sleep session in which the polysomnogram data is obtained: WASO≥50 minutes, mean duration of awakening≥1.2 minutes, number of awakenings≥5 min≥1, and $WASO_{5min}$≥15 minutes.

To identify parameters (e.g., sleep parameters) that are indicative of one of (a) to (d), data collected from multiple subjects may be analysed, the data comprising parameters associated with each of the multiple subjects and an accurate identification of whether each subject is suffering from one of (a) to (d). Such an analysis may also be used to define thresholds associated with the parameters for use in a rule-based method of determining whether the subject is suffering from (a), (b), (c) or (d). A statistic (e.g., minimum value, maximum value, first quartile, second quartile, third quartile, median, mean, or the like) associated with a parameter may be determined for subjects suffering from each of (a) to (d). For example, WASO may be determined for each subject of a plurality of subjects who have been identified as suffering from OSA (e.g., an accurate identification by a clinician), and a mean value of WASO for these subjects may be determined Similarly, one or more statistics characterising WASO for subjects who have been identified as suffering from COMISA (e.g., by an accurate assessment by a clinician) may be determined. A statistic may be determined for other parameters (e.g., other sleep parameters), including, for example, a mean duration of awakenings, a number of long awakenings, $WASO_{5min}$, or the like. Statistics determined for parameters may be used to inform, or define, threshold values used in rules of a rule-based method of determining whether a subject has one or (a) to (d). For example, it may be determined that the median value for WASO for subjects suffering from OSA (e.g., 55 minutes) is lower than the median value for WASO for subjects suffering from COMISA (e.g., 80 minutes). In this case, a rule may be defined such that a WASO value for a subject must be higher than 70 minutes in order for COMISA to be identified. In other examples, two or more rules may be defined based on statistics associated with a parameter (e.g., WASO) for subjects suffering from one of (a) to (d). For example, a first rule may be that a WASO value must be higher than 40 minutes and a second rule may be that a WASO must be less than 65 minutes, in order to identify OSA.

The rules may comprise parameters, or attributes, associated with a subject comprising gender, body mass index, age, or the like.

In some examples, an accuracy of identification that a subject is suffering from one of (a) to (d) may be improved by using additional parameters to discriminate between (a) to (d).

In some examples, a polysomnogram may be performed when a subject is suspected for OSA. Thereafter, the subject may be identified as suffering from COMISA and can be referred for evaluation of COMISA if certain threshold values are reached.

In some embodiments, the rule-based method used by the processor 102 may further comprise assigning a weight to each of the two or more sleep parameters; and calculating a sum of the weights corresponding to each sleep parameter that satisfies a respective condition based on a respective comparison of each of the two or more sleep parameters to its respective threshold value. In other words, a first sleep parameter may be compared to a first threshold value, and a second sleep parameter may be compared to a second threshold value. A first respective condition may be that a value of the first sleep parameter is in excess of the first threshold. A second respective condition may be that a value of the second sleep parameter is in excess of the second threshold. The respective threshold values may be the same threshold values used in the step of: comparing each of the two or more sleep parameters to a respective threshold value (e.g., in relation to using the rule-based method to determine whether a subject is suffering from (a), (b), (c) or (d)). It may then be determined whether a subject is suffering from (a), (b), (c) or (d) based on the sum of the weights. Assigning weights to sleep parameters in this way reflects the discriminatory power of each of the sleep parameters. In other words, a first weight may be assigned to the first sleep parameter and a second weight may be assigned to the second sleep parameter. If, for example, the first sleep parameter exceeds the first threshold value and the second sleep parameter exceeds the second threshold value, the first weight and the second weight may be added up to obtain a total weight associated with the sleep parameters. If, for example, the first sleep parameter does not exceed the first threshold value and the second sleep parameter exceeds the second threshold value, a total weight associated with the sleep parameters may be determined to be the value of the second weight. If, for example, the first sleep parameter does not exceed the first threshold value and the second sleep parameter does not exceed the second threshold value, a total weight associated with the sleep parameters may be determined to be zero.

For example, a weight of 1 may be associated with WASO, a weight of 1.5 for a mean duration of awakenings during a sleep session, and a weight of 2 for a number of awakenings with a duration of greater than 5 minutes. Conditions associated with these parameters may be that WASO is greater than 15 minutes during a sleep session, that a mean duration of awakenings during the sleep session is greater than 3 minutes, and that a number of awakenings with a duration of greater than 5 minutes is greater than 4.

By way of example only, it may be determined that a subject is suffering from COMISA if the sum of the weights for these three sleep parameters is greater than 3. This condition may be achieved if, for example, all three conditions are satisfied (e.g., WASO is greater than 15 minutes, the mean duration of awakenings is greater than 3 minutes and the number of awakenings with a duration of greater than 5 minutes is greater than 4), because the sum of the weights for the sleep parameters would be 4.5. It may also be determined that the subject is suffering from COMISA if, for example, the mean duration of awakenings is greater than 3 minutes and the number of awakenings with a duration of greater than 5 minutes is greater than 4, which would result in a sum of the weights for these sleep parameters of 3.5, which is greater than the threshold of 3 required for COMISA identification in this example.

In some embodiments, the processor 102 may be configured to determine whether the subject is suffering from (a), (b), (c) or (d) by using a decision tree comprising two or more nodes, each of the two or more nodes relating to a respective sleep parameter of the two or more sleep parameters. In other words, at each node, a value of a parameter may be compared to a threshold, and the outcome of that comparison may determine which branch of the decision tree is subsequently considered. The nodes may comprise parameters, or attributes, associated with a subject including a gender of the subject, a body mass index of the subject, an age of the subject, or the like. Where a node of the decision tree relates to a parameter in which there are two or more discrete values (e.g., two discrete values, such as male and female), then such a parameter may be matched with one of the discrete values, and the outcome of the matching may determine which branch of the decision tree is subsequently considered. The parameters of the nodes may be based on characteristics that are discriminative between OSA, insomnia and COMISA. Parameters (e.g., sleep parameters, gender, body mass index, age, or the like) may be ranked using a parameter, or attribute, selection measure, which is a heuristic for determining the ranking of parameters. For example, different thresholds may be used for men and for women (e.g., women may have longer WASO than men). In another example, different thresholds may be used depending on age (e.g., older subjects may have an inherently higher sleep fragmentation, or longer WASO times). In this case, a threshold may be increased for older subjects. In another example, in a decision tree, a threshold may determine which branch of the decision tree to follow. For example, if it is established that an AHI is larger than 5, a check may be made as to whether the subject is a male or a female; in case that the subject is female, the subject's BMI may be compared to a threshold, such that a WASO time may be considered when the subject is both female and has a BMI above (or below) a threshold value. In this example, if the subject is a male, a WASO value may be considered without first considering the subject's BMI. In another example, in a clustering algorithm, sleep parameters may be used directly, for example, to create male/female, or young/old age, specific clusters, which may be separately built and/or evaluated for the remaining sleep parameters. An age (e.g., young/old) may be based on a threshold (e.g., 40 years). In machine learning classifiers (e.g., Bayesian, neural networks, or the like), sleep parameters may be used directly as input values (e.g., features) based on which a machine learning classifier may infer on the presence of a condition.

Figure 2:
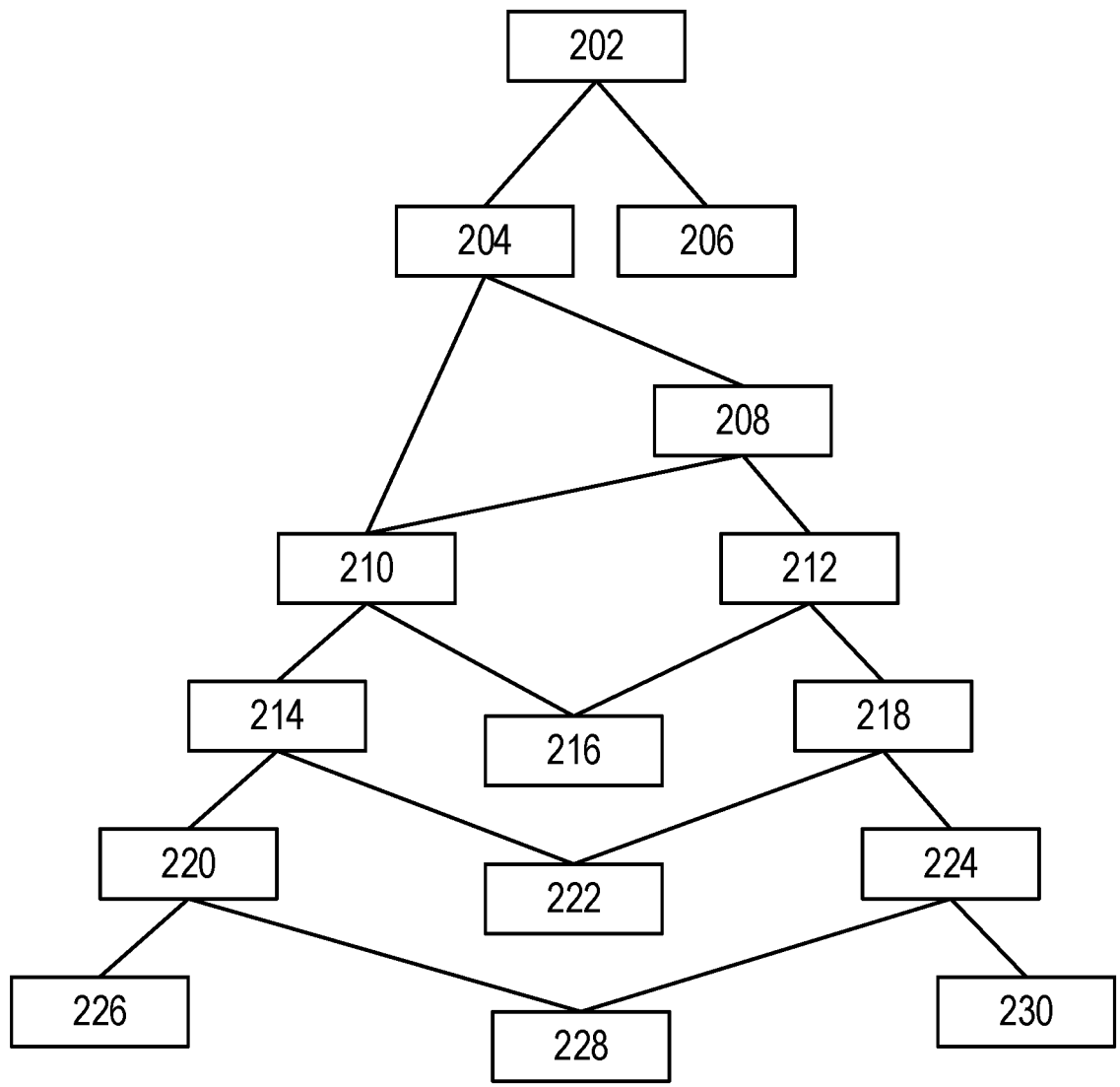
FIG. 2 is an example of a decision tree according to the present invention.

The processor 102 may be further configured to compare each of the two or more sleep parameters to respective threshold values. A given parameter (e.g., sleep parameter) may be associated with a different threshold dependent on where the node is in the decision tree. For example, FIG. 2 shows a decision tree comprising a first node 202 comprising apnoea-hypopnea index. A first threshold value associated with the first node may be that the apnoea-hypopnea index is equal to, or greater than, a value of 5. If a determined apnoea-hypopnea index associated with a sleep session of a subject satisfies this condition (e.g., is equal to, or smaller than, 5), then it may be determined that the subject is not suffering from OSA nor COMISA, which is represented by node 206. In other words, if a determined apnoea-hypopnea index associated with a sleep session of a subject satisfies this condition (e.g., is equal to, or smaller than, 5), then the decision tree moves from a first node (e.g., node 202) to a second node (e.g., node 206), where node 206 indicates that the subject in question is not suffering from OSA nor COMISA.

Further referring to FIG. 2, if the determined apnoea-hypopnea index associated with the sleep session of the subject is more than 5, then node 204 is the second node of the decision tree evaluated (e.g., the decision tree moves from node 202 to node 204). In this case, if the subject is male, then the third node of the decision evaluated is node 210 (e.g., the decision tree moves from node 204 to node 210), which, in this example, is whether WASO associated with the sleep session of the subject is equal to, or greater than, 40. In this case, if the WASO associated with the sleep session of the male subject is less than 40, then it may be determined that the subject is not suffering from COMISA, and the decision tree moves from node 210 to node 216. If the WASO associated with the sleep session of the male subject is equal to, or greater than, 40, then the next node of the decision tree is evaluated (e.g., node 214).

In contrast, if the subject is female, then the third node of the decision tree evaluated is node 208, which, in this example, is whether the subject's body mass index is greater than 25. In this case, if the female subject's body mass index is equal to, or less than, 25, then the fourth node of the decision tree evaluated is node 212 comprising whether WASO associated with the sleep session of the subject is equal to, or greater than, 50. In this case, if the WASO associated with the sleep session of the female subject is less than 50, then it may be determined that the subject is not suffering from COMISA, and the decision tree moves from node 212 to node 216. If the female subject's body mass index is not greater than 25, then the fourth node of the decision tree evaluated is node 210 comprising whether WASO associated with the sleep session of the subject is equal to, or greater than, 40. In this case, if the WASO associated with the sleep session of the female subject is less than 40, then it may be determined that the subject is not suffering from COMISA, and the decision tree moves from node 212 to node 216.

FIG. 2 shows further nodes 214, 218, 220, and 224, which may correspond to (i) a number of awakenings lasting for at least five minutes of equal to, or greater than 1, (ii) a number of $WASO_{5min}$ instances (e.g., a number of awakenings lasting for at least five minutes) of equal to, or greater than 2, (iii) $WASO_{5min}$ equal to, or greater than, 10 minutes during a sleep session, and (iv) $WASO_{5min}$ equal to, or greater than, 15 minutes during a sleep session, respectively. Nodes 226 and 230 may each correspond to a decision, or identification, that a subject is suffering from COMISA, whereas nodes 216, 222 and 228 may each correspond to a decision that a subject is not suffering from COMISA.

In case the decision tree evaluates in node 214 that the subject has a number of awakenings lasting for at least five minutes of equal to, or greater than 1, the decision tree then evaluates node 220. In case the decision tree evaluates in node 220 that the $WASO_{5min}$ is equal to, or greater than, 10 minutes during a sleep session, the decision tree proceeds to node 226 corresponding to a decision that the subject is suffering from COMISA.

In case the decision tree evaluates in node 212 that the WASO associated with the sleep session of the subject is equal to, or greater than, 50, the decision tree further evaluates node 218. In case the decision tree evaluates in node 218 that the subject has a number of awakenings lasting for at least five minutes of equal to, or greater than 1, the decision tree then evaluates node 224. In case the decision tree evaluates in node 224 that the $WASO_{5min}$ is equal to, or greater than, 15 minutes during a sleep session, the decision tree proceeds to node 230 corresponding to a decision that the subject is suffering from COMISA.

In case the decision tree evaluates in node 214 that the subject does not have a number of awakenings lasting for at least five minutes of equal to, or greater than 1, or in case the decision tree evaluates in node 218 that the subject does not have a number of awakenings lasting for at least five minutes of equal to, or greater than, 1, then the decision tree proceeds to node 222 corresponding to a decision that a subject is not suffering from COMISA.

In case the decision tree evaluates in node 220 that the $WASO_{5min}$ is not equal to, or greater than, 10 minutes during a sleep session, or in case the decision tree evaluates in node 224 that the $WASO_{5min}$ is not equal to, or greater than, 15 minutes during a sleep session, then the decision tree proceeds to node 228 corresponding to a decision that a subject is not suffering from COMISA.

In some embodiments, the processor 102 may be configured to determine whether the subject is suffering from (a), (b), (c) or (d) by using a clustering algorithm comprising associating the subject with a cluster comprising subjects who have been determined to have suffered from one of (a), (b), (c) or (d) according to physiological data. Clustering may comprise an initial classification, or characterisation, stage comprising an unsupervised method that can be used to group subjects with similar characteristics into homogeneous groups (e.g., clusters) while maximizing heterogeneity across groups, which may thereby reveal hidden structures or clusters. In other words, clustering may be used to identify parameters associated with a subject (e.g., sleep parameters, body mass index, gender, or the like) that are indicative of COMISA, OSA, insomnia, or neither OSA nor insomnia. In this case, a clustering algorithm may need to be supplied with training data comprising parameters associated with each of a plurality of subjects, combined with an accurate identification (e.g., from a clinician) of whether each subject is suffering from OSA, insomnia, COMISA, or neither OSA nor insomnia. For instance, a clustering algorithm may determine that male subjects with a body mass index greater than 30 with a $WASO_{5min}$ of at least 20 minutes during a sleep session may be suffering from COMISA. Thus, clustering may reveal previously unknown combinations of parameters associated with a subject that are indicative of OSA, insomnia, or COMISA. The result of the initial characterisation stage may be that one or more groups (e.g., clusters, pre-defined clusters, or the like) are determined, comprising parameters associated with subjects suffering from one of (a) to (d).

Another advantage of using clustering is the possibility to find clusters, and thus different phenotypes, within a COMISA group. Potentially, patients within different COMISA clusters can benefit from different treatment strategies. For example, one or more of the following variables could be used for clustering: gender, sleep efficiency, WASO, total sleep time, mean duration of awakening, number of awakenings≥5 minutes, and $WASO_{5min}$. For example, four clusters may be identified, including (i) cluster 0: COMISA type 1: symptoms and characteristics are mainly related to OSA, insomnia complaints appear minor compared to the OSA complaints, (ii) cluster 1: COMISA type 2: symptoms and characteristics are mainly related to insomnia, OSA complaints appear minor compared to the insomnia complaints, (iii) Cluster 2: OSA and (iv) cluster 3: insomnia.

In some examples, a cluster may comprise subjects from more than one of (a) to (d). For example, a cluster comprising subjects suffering from COMISA may also comprise one or more subjects suffering from OSA (and not insomnia or COMISA). Using more parameters (e.g., sleep parameters) to discriminate between each of (a) to (d) may help to reduce these artefacts.

A clustering algorithm may be used to subsequently characterise a new subject (e.g., a subject not forming part of the subjects used in the initial characterisation of the clustering algorithm) using parameters associated with the subject, to identify whether the subject is suffering from one of (a) to (d). The parameters associated with the subject may be compared to parameters associated with each cluster of the clustering algorithm such that the subject is classified according to closest cluster found. In some examples, the parameters of the subject may be compared to prototypical characteristics (e.g., centroids) of each cluster. In some examples, the subject may not be classified as suffering from one of (a) to (d) where a distance between the parameters of the subject and each of the pre-defined clusters is too large.

In some embodiments, the processor 102 may be configured to determine whether the subject is suffering from (a), (b), (c) or (d) by using a predictive model trained to classify the subject as suffering from (a), (b), (c) or (d) based on inputs comprising the received data. The predictive model may comprise a Naive Bayes classifier, a K-Nearest Neighbors algorithm, or an artificial neural network. Supervised methods may be used that use pre-categorized training datasets to predict the likelihood that subsequent data will fall into one of the predetermined categories. Naive Bayes calculates the possibility of whether or not a data point belongs within a certain category (e.g., a pre-defined category) and assumes that the effect of each particular feature (e.g., a sleep parameter) in a class is independent of other features. K-Nearest Neighbors is a pattern recognition algorithm that uses training datasets to find the k closest relatives in future examples.

The results achieved using Naive Bayes and K-Nearest Neighbors using parameters associated with a subject comprising gender, sleep efficiency, WASO, total sleep time, mean duration of awakening, number of awakenings≥5 minutes, and $WASO_{5min}$, are summarised in Tables 2 and 3, respectively.

TABLE 2

Results obtained with Naïve Bayes

| | | True value | |
|---|---|---|---|
| | | COMISA | OSA |
| Predicted value | COMISA | 15 | 21 |
| | OSA | 13 | 64 |

TABLE 3

Results obtained with K-Nearest Neighbors

|  |  | True value | |
| --- | --- | --- | --- |
|  |  | COMISA | OSA |
| Predicted value | COMISA | 7 | 26 |
|  | OSA | 9 | 71 |

The accuracy achieved by using Naive bayes was 69.9% and the accuracy achieved using K-Nearest Neighbors was 69.0%.

In some embodiments, the received data may comprise data from a plurality of sleep sessions such that the processor 102 may be configured to determine whether a subject is suffering from (a), (b), (c) or (d) further based on a parameter indicative of a variability of at least one of the determined sleep parameters between the sleep sessions. Parameters indicative of a variability of a sleep parameter may comprise a variability in the length of time in which the subject wakes up after initially falling asleep, variability in WASO over the course of the sleep sessions, or the like. Variability may be determined by computing the variance, range, or the like, of sleep parameter over the course of multiple sleep sessions. Parameters indicative of a variability of at least one of the determined sleep parameters between the sleep sessions may comprise average trends, variability in one or more sleep parameters, differences between weeknights and weekend nights, differences between different months of the year, or the like. For example, a parameter, or statistic (e.g., an average value, a median value, a variance, a range, a percentile, or the like) associated with a parameter (e.g., a sleep parameter) may be calculated over a window of a given number of nights or weeks. It may be that the sleep statistics in subjects with OSA show more stability compared to subjects with insomnia or subjects with COMISA, since night to night variability is known to be present in insomnia.

Figure 3:
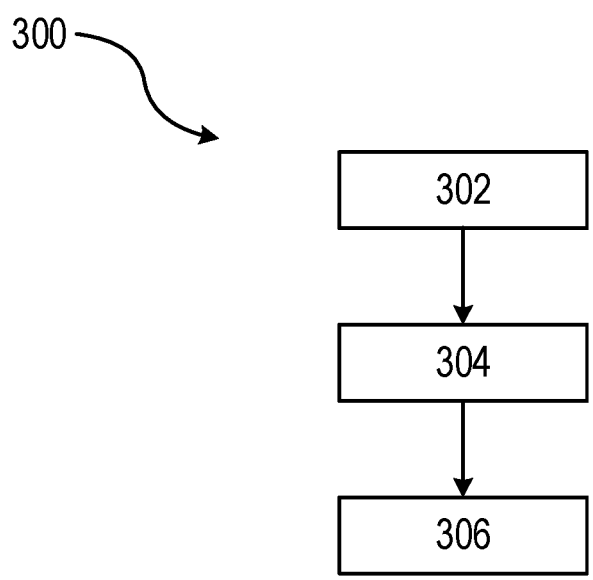
FIG. 3 is a flowchart of an example of a method for assessing sleep of a subject.

According to a second aspect, the invention provides a computer-implemented method 300 for assessing sleep of a subject is provided. FIG. 3 is a flowchart of an example of such a method 300. The method comprises, at step 302, receiving data indicative of one or more physiological parameters associated with a subject.

The method 300 comprises, at step 304, determining, based on the data, two or more sleep parameters relating to sleep of the subject.

The method comprises, at step 306, determining, based on the sleep parameters, whether the subject is suffering from (a) obstructive sleep apnoea, (b) insomnia, (c) comorbid insomnia and obstructive sleep apnoea, or (d) neither obstructive sleep apnoea nor insomnia, wherein a first sleep parameter of the two or more sleep parameters comprises Wakefulness After Sleep Onset for at least X Minutes, $WASO_{Xmin}$ wherein $WASO_{Xmin}$ comprises the sum of awakenings with a duration of X minutes or longer during a sleep session, wherein X is equal to, or greater than, 1.

In some embodiments, the method may comprise determining a parameter indicative of a variability of at least one of the determined sleep parameters between the sleep sessions, wherein determining (306) whether the subject is suffering from (a), (b), (c) or (d) is further based on the parameter indicative of a variability of at least one of the determined sleep parameters between the sleep sessions.

Steps of the method may, for example, be performed using the processor 102.

Figure 4:
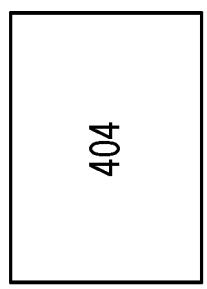
FIG. 4 is a schematic illustration of a processor in communication with a non-transitory computer readable medium.
Figure 4:
Figure 4:
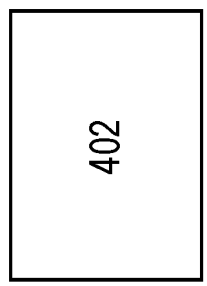

According to a third aspect, the present invention provides a computer program product. FIG. 4 is a schematic illustration of an example of a processor 402 in communication with a computer-readable medium 404. The computer program product comprises a non-transitory computer-readable medium 404, the computer readable medium having computer-readable code embodied therein, the computer-readable code being configured such that, on execution by a suitable computer or processor 404, the computer or processor is caused to perform steps of the methods 300 described herein.

The processor 102, 404 can comprise one or more processors, processing units, multi-core processors or modules that are configured or programmed to control the apparatus 100 in the manner described herein. In particular implementations, the processor 102, 404 can comprise a plurality of software and/or hardware modules that are each configured to perform, or are for performing, individual or multiple steps of the method described herein.

The term "module", as used herein is intended to include a hardware component, such as a processor or a component of a processor configured to perform a particular function, or a software component, such as a set of instruction data that has a particular function when executed by a processor.

It will be appreciated that the embodiments of the invention also apply to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to embodiments of the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g., Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An apparatus for assessing sleep of a subject, the apparatus comprising:
   a processor configured to:
      receive data indicative of one or more physiological parameters associated with a subject;
      determine, based on the data, two or more sleep parameters relating to sleep of the subject; and
      determine, based on the two or more sleep parameters, whether the subject is suffering from
      (a) obstructive sleep apnoea (OSA),
      (b) insomnia,
      (c) comorbid insomnia and obstructive sleep apnoea (COMISA), or
      (d) neither OSA nor insomnia,
      wherein a first sleep parameter of the two or more sleep parameters comprises Wakefulness After Sleep Onset for at least X Minutes ($WASO_{Xmin}$),
      wherein $WASO_{Xmin}$ comprises the sum of awakenings with a duration of X minutes or longer during a sleep session,
      wherein X is equal to, or greater than, 1;
      responsive to a determination that the subject is suffering from (a) or (c), generate a control signal that changes a setting of a positive airway pressure (PAP) device for treatment of the subject; and
      responsive to a determination that the subject is suffering from (b) withhold said control signal.

2. The apparatus according to claim 1, wherein X is equal to 5.

3. The apparatus according to claim 1, wherein a second sleep parameter of the two or more sleep parameters comprises a parameter selected from a group comprising:
   apnoea-hypopnea index,
   oxygen desaturation index,
   a mean duration of awakenings during a sleep session,
   a variance in durations of awakenings during a sleep session,
   a number of awakenings longer than a defined time period during the
   sleep session,
   wake after sleep onset,
   total sleep time,
   apnoea index,
   hypopnea index,
   3% oxygen desaturation index,
   4% oxygen desaturation index,
   sleep onset latency,
   sleep efficiency,
   time in an N1 sleep stage,
   time in an N2 sleep stage,
   time in an N3 sleep stage,
   time in an REM sleep stage,
   a number of sleep stage transitions,
   a number of sleep stage transitions per unit time,
   a duration in which the subject is in a sleep stage during a sleep session, and
   a number of transitions between any two of stages N1, N2, N3, REM and wake.

4. The apparatus according to claim 1, wherein the processor is further configured to:
   generate, based on the determination that the subject is suffering from (a), (b), (c) or (d), a control signal for delivery to a recipient device, wherein the control signal causes an alarm to sound at the recipient device.

5. The apparatus according to claim 1, wherein the processor is configured to use a rule-based method to determine whether the subject is suffering from (a), (b), (c) or (d); the rule-based method comprising:
   comparing each of the two or more sleep parameters to a respective threshold value.

6. The apparatus according to claim 5, wherein the rule-based method further comprises:
   assigning a weight to each of the two or more sleep parameters; and
   calculating a sum of the weights corresponding to each sleep parameter that satisfies a respective condition based on a respective comparison of each of the two or more sleep parameters to its respective threshold value,
   wherein the step of determining whether a subject is suffering from (a), (b), (c) or (d) comprises using the sum of the weights.

7. The apparatus according to claim 1, wherein the processor is configured to determine whether the subject is suffering from (a), (b), (c) or (d) by using a decision tree comprising two or more nodes, each of the two or more nodes relating to a respective sleep parameter of the two or more sleep parameters, and wherein the processor is further configured to:
   compare each of the two or more sleep parameters to respective threshold values.

8. The apparatus according to claim 1, wherein the processor is configured to determine whether the subject is suffering from (a), (b), (c) or (d) by using a clustering algorithm, wherein the processor is further configured to:
   associate the subject with a cluster comprising subjects who have been determined to have suffered from one of (a), (b), (c) or (d) according to physiological data.

9. The apparatus according to claim 1, wherein the processor is configured to determine whether the subject is suffering from (a), (b), (c) or (d) by using a predictive model trained to classify the subject as suffering from (a), (b), (c) or (d) based on inputs comprising the received data.

10. The apparatus according to claim 9, wherein the predictive model comprises a Naïve Bayes classifier, a K-Nearest Neighbors algorithm, or an artificial neural network.

11. The apparatus according to claim 1, wherein the data indicative of a physiological parameter associated with a subject comprises at least one type of data selected from a group comprising:
  polysomnography data,
  electroencephalogram data,
  electrooculogram data,
  electromyogram data,
  electrocardiogram data,
  photoplethysmography data,
  respiratory belt data,
  ballistocardiography data,
  inductance data,
  capacitance data,
  airflow data,
  Doppler radar data,
  accelerometer data,
  image data, and
  pulse oximetry data.

12. The apparatus according to claim 1, wherein the processor is configured to determine whether the subject is suffering from (a), (b), (c) or (d) further based on information comprising one of more of:
  a gender of the subject, a body mass index of the subject, and an age of the subject.

13. The apparatus according to claim 1, wherein the received data comprises data from a plurality of sleep sessions, and wherein the processor is configured to determine whether the subject is suffering from (a), (b), (c) or (d) further based on a parameter indicative of a variability of at least one of the determined sleep parameters between the sleep sessions.

14. A computer-implemented method for assessing sleep of a subject, comprising:
  receiving data indicative of one or more physiological parameters associated with a subject;
  determining, based on the data, two or more sleep parameters relating to sleep of the subject; and
  determining, based on the two or more sleep parameters, whether the subject is suffering from
    (a) obstructive sleep apnoea (OSA),
    (b) insomnia,
    (c) comorbid insomnia and obstructive sleep apnoea (COMISA) or
    (d) neither OSA nor insomnia,
  wherein a first sleep parameter of the two or more sleep parameters comprises Wakefulness After Sleep Onset for at least X Minutes ($WASO_{Xmin}$),
  wherein $WASO_{Xmin}$ comprises the sum of awakenings with a duration of X minutes or longer during a sleep session, wherein X is equal to, or greater than, 1;
  responsive to a determination that the subject is suffering from (a) or (c), generate a control signal that changes a setting of a positive airway pressure (PAP) device for treatment of the subject; and
  responsive to a determination that the subject is suffering from (b) withhold said control signal.

15. A non-transitory computer readable medium having instructions stored thereon, which when executed by a processor, cause the processor to perform the method of claim 14.

* * * * *